(12) United States Patent
Underhill et al.

(10) Patent No.: US 11,823,501 B2
(45) Date of Patent: Nov. 21, 2023

(54) ASSOCIATING VOTING SESSIONS WITH TABULATION MACHINES IN ELECTRONIC VOTING

(71) Applicant: Oracle International Corporation, Redwood City, CA (US)

(72) Inventors: Thomas Underhill, Murrieta, CA (US); Adam Erickson, Pflugerville, TX (US)

(73) Assignee: Oracle International Corporation, Redwood City, CA (US)

( * ) Notice: Subject to any disclaimer, the term of this patent is extended or adjusted under 35 U.S.C. 154(b) by 216 days.

(21) Appl. No.: 15/681,084

(22) Filed: Aug. 18, 2017

(65) Prior Publication Data

US 2019/0057567 A1 Feb. 21, 2019

(51) Int. Cl.
| | |
|---|---|
| *G07C 13/00* | (2006.01) |
| *H04L 9/40* | (2022.01) |
| *H04L 9/30* | (2006.01) |
| *H04L 9/32* | (2006.01) |
| *H04L 9/14* | (2006.01) |
| *H04L 9/08* | (2006.01) |

(52) U.S. Cl.
CPC ............ *G07C 13/00* (2013.01); *H04L 9/0825* (2013.01); *H04L 9/14* (2013.01); *H04L 9/30* (2013.01); *H04L 9/3226* (2013.01); *H04L 63/0442* (2013.01); *G06Q 2220/00* (2013.01); *H04L 2209/463* (2013.01)

(58) Field of Classification Search
CPC ......... G07C 13/00; H04L 9/0825; H04L 9/14; H04L 9/30; H04L 9/3226; H04L 63/0442
See application file for complete search history.

(56) References Cited

U.S. PATENT DOCUMENTS

| | | | |
|---|---|---|---|
| 7,565,540 B2 | 7/2009 | Bogasky et al. | |
| 2002/0032775 A1* | 3/2002 | Venkataramaiah | ......................... H04L 29/12009 709/225 |
| 2002/0077887 A1* | 6/2002 | London Shrader | .... G07C 13/00 705/12 |
| 2006/0013402 A1* | 1/2006 | Sutton | ................... H04L 9/0844 380/282 |
| 2006/0041514 A1* | 2/2006 | Bogasky | ................ G07C 13/00 705/64 |

(Continued)

OTHER PUBLICATIONS

"Public Key Cryptography, Jul. 10, 2017, Wikipedia.org" (Year: 2017).*

(Continued)

*Primary Examiner* — Nilesh B Khatri

(57) ABSTRACT

An electronic voting machine obtains session information in an encrypted state for conducting a voting session. The voting machine decrypts the session information using a decryption key that is specific to the voting machine. A ballot provided in the session information may then be presented in a user interface through which votes are received. The session information also includes an encryption key for a specific tabulation machine associated a priori with the voting session, as well as one or more datastores. The voting machine encrypts the votes with the encryption key and sends the votes in an encrypted state to the one or more datastores. The tabulation machine may then retrieve the votes from the location(s) and decrypt them using a corresponding private key.

17 Claims, 9 Drawing Sheets

(56) References Cited

U.S. PATENT DOCUMENTS

| | | | |
|---|---|---|---|
| 2009/0179071 A1* | 7/2009 | Backert | G06F 21/606 |
| | | | 235/51 |
| 2010/0017274 A1* | 1/2010 | Liesenfelt | G07C 13/00 |
| | | | 705/12 |
| 2012/0053997 A1* | 3/2012 | Garfinkle | H04L 63/08 |
| | | | 235/386 |
| 2013/0073868 A1* | 3/2013 | Forlenza | H04L 9/00 |
| | | | 713/189 |
| 2013/0144686 A1 | 6/2013 | Hotto et al. | |
| 2014/0207536 A1* | 7/2014 | Scott | G07C 13/00 |
| | | | 705/12 |
| 2014/0263639 A1* | 9/2014 | Bolton | G07C 13/00 |
| | | | 235/386 |
| 2015/0221153 A1* | 8/2015 | Dashiff | G07C 13/00 |
| | | | 705/12 |
| 2015/0356804 A1* | 12/2015 | Mitchel | G07C 13/00 |
| | | | 705/12 |
| 2016/0027229 A1 | 1/2016 | Spanos et al. | |
| 2016/0086408 A1* | 3/2016 | Myr | H04L 9/3226 |
| | | | 705/12 |
| 2017/0063525 A1* | 3/2017 | Bacon | H04L 9/008 |
| 2017/0124556 A1* | 5/2017 | Seger, II | H04L 69/40 |
| 2018/0205707 A1* | 7/2018 | Bellala | H04L 63/0421 |
| 2019/0019366 A1* | 1/2019 | Chepel | H04L 9/3255 |

OTHER PUBLICATIONS

"RFC 791 Internet Protocol, Sep. 1981, Information Sciences Institute" (Year: 1981).*

B R Purushothama et al., Design and Implementation of Secure Internet Based Voting System with User Anonymity Using Identity Based Encryption System, Sep. 1, 2009, IEEE, pp. 474-481 (Year: 2009).*

Ali Azougaghe et al., An Electronic Voting System Based on Homomorphic Encryption and Prime Numbers, Dec. 14, 2015, pp. 140-145 (Year: 2015).*

Christian Meter, "Design of Distributed Voting System", Heinrich-Heine-Universitat Dusseldorf; arXiv:1702.02566v1 [cs.CR] Feb. 8, 2017; retrieved from https://arxiv.org/pdf/1702.02566.pdf, Sep. 24, 2015, pp. 1-125.

Enhanced Data Center Security with Oracle Sparc and Oracle Solaris, Whitepaper, Mar. 8, 2016, Coalfire.com.

* cited by examiner

ASSOCIATING VOTING SESSIONS WITH TABULATION MACHINES IN ELECTRONIC VOTING

TECHNICAL BACKGROUND

Electronic voting as become commonplace, but still suffers from persistent concerns about its security and efficacy. For instance, the fear that a given vote may be hacked or otherwise rendered unreliable has consistently held back the widespread adoption of electronic voting, while the apparent expense and complexity of some electronic voting systems dissuades some potential users.

A variety of solutions have been tried with respect to securing and simplifying electronic voting. A basic implementation uses stand-alone electronic voting machines connected to a network. Voters cast their votes through the voting machines and the voting machines communicate the votes to a tabulation system. The voting may take place in a supervised setting, such as a polling station, or it may be "remote," such as when the vote is cast on an individual's own mobile phone, tablet, computer, or other such device.

In either case, encryption can be used to secure both the votes and the communication channel over which they travel. One level of encryption routinely protects communications sent and received between clients and servers, while another level of encryption protects the voting data itself. The votes can be decrypted and counted to ascertain the results of the elections, ballot measures, and other questions that may have been presented to the voters on their ballots.

SUMMARY

Technology is disclosed herein that improves electronic voting. In various implementations, an electronic voting machine (hereinafter referred to as a voting machine), obtains session information in an encrypted state for conducting a voting session. The voting machine decrypts the session information using a decryption key that is specific to the voting machine. A ballot provided in the session information may then be presented in a user interface through which votes are received.

The session information also includes an encryption key for a specific tabulation machine associated a priori with the voting session, as well as one or more datastores. The voting machine encrypts the votes using the encryption key and sends the votes in an encrypted state to the one or more datastores. The tabulation machine may then retrieve the votes from the location(s) and decrypt them using its own key.

In some implementations, for the tabulation machine to be associated with a voting session, specific voting machines are paired with a given tabulation machine. Those voting machines are then deployed to facilitate the voting session. Votes originating from the specified voting machines may only be decrypted successfully by the associated tabulation machine. This may be accomplished by, for example, encrypting the votes using a public key known for the tabulation machine such that only the tabulation machine's private key can decrypt the votes successfully. In some cases, the tabulation machine may decrypt and tabulate the votes in-memory such that the votes never reside outside of the tabulation machine's memory in a decrypted state.

In still other implementations, for the tabulation machine to be associated with a voting session, specific ballot questions on a ballot may be paired with a given tabulation machine, while other ballot questions on the ballot may be paired with a different tabulation machine. Votes casts for the ballot questions may be encrypted with the public key of the first tabulation machine, while the other ballot questions may be encrypted with the public key of the other tabulation machine. The respective tabulation machines may then decrypt and count the votes using their respective private keys, possible entirely in-memory.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
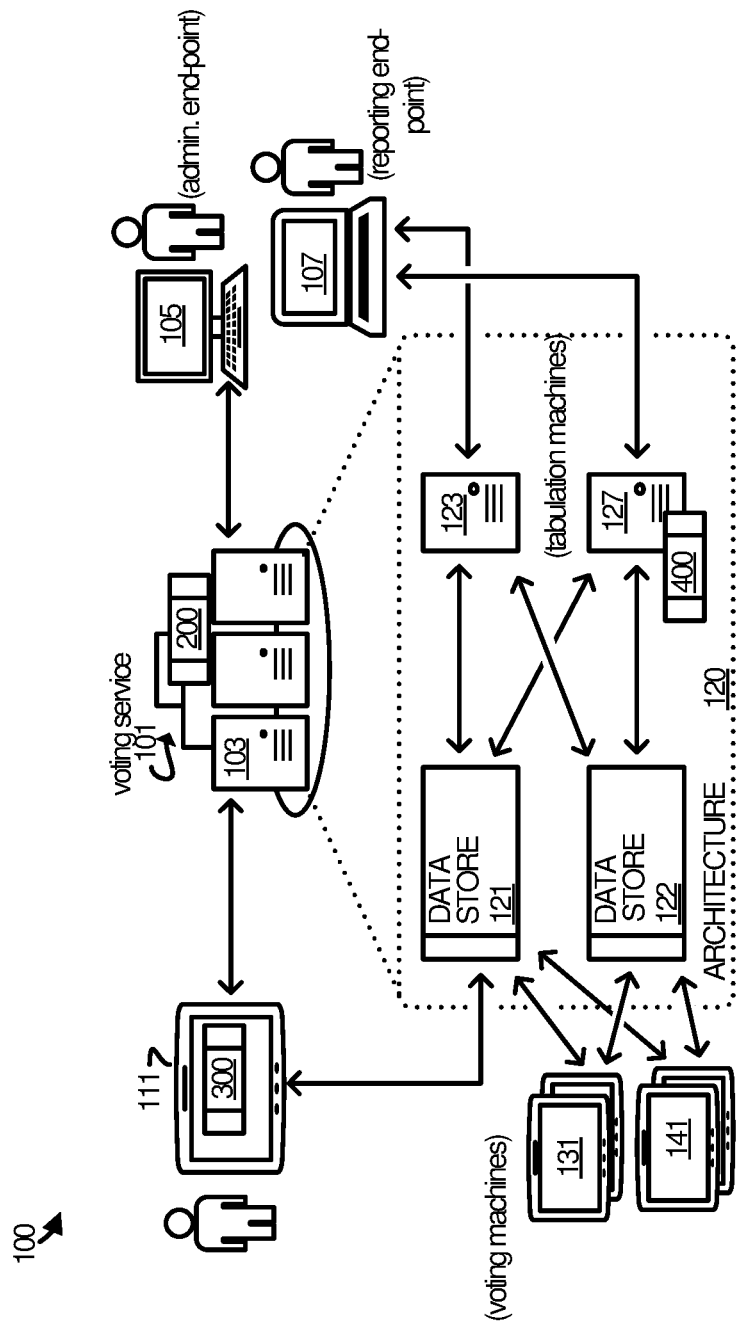
FIG. 1 illustrates an operational architecture for implementing embodiments of enhanced electronic voting.
Figure 2:
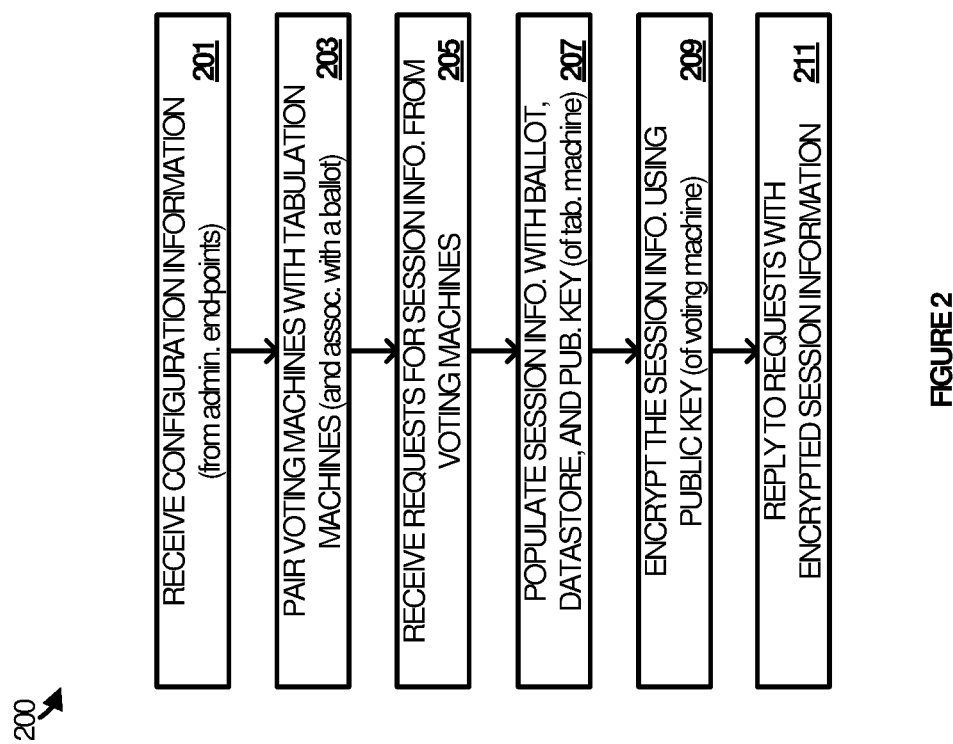
FIG. 2 illustrates a provisioning process employed by a voting service in embodiments of enhanced electronic voting.

Technology is disclosed herein that enhances electronic voting by associating tabulation machines with voting sessions in advance of a given vote, so that the resulting voting data can be secured during the voting process and the tabulation process.

In a brief example, specific voting machines are identified ahead of a vote. These may be, for instance, a set of voting machines associated with an election commission, a jurisdiction, an enterprise, or any other type of organization that may be carrying out a vote. The vote may pertain to an election, a poll, or any other type of vote. Indeed, the vote may be carried out entirely electronically or only partly electronically.

The voting machines are then associated with one or more tabulation machines that will be used to count the votes that are cast. Examples of a suitable tabulation machine include, but are not limited to, the SPARC M7-8 server from Oracle®. The tabulation machine(s) may be hosted in a public cloud environment, a private cloud environment, on-premises, via remotely deployable infrastructure, or in some other manner. Examples of voting machines include customized electronic voting machines, personal computing or communication devices, or any other suitable device.

In scenarios where remotely deployable infrastructure is employed, one or more tabulation machines associated with a voting session could be transported to a polling station or other such location. The tabulation machine could thus be made present in the particular jurisdiction where a vote is taking place, allowing election personnel to oversee the physical security of the tabulation machines. The tabulation machines and other attendant infrastructure resources could be arranged in a shipping container, for example, capable of being transported to the location of an election for which they have been tasked with tabulating the results of the election.

A given voting machine (or other aspects of a voting session) may become associated with a tabulation machine during the setup and configuration process for an election, poll, or the like. End-users tasked with setting up a vote may engage with a voting service hosted in the cloud. The voting service may accept various types of configuration information pertaining to the voting session, such as a ballot, ballot questions, and possibly the identity of the voting machines to be deployed. In other scenario, the voting service itself may maintain a catalog or roster of available voting machines that can be deployed.

With the configuration information known, the voting service may then select or otherwise determine which one or more tabulation machines to deploy in support of the election or poll. Session information may be produced by the voting service on a per-voting machine basis with which to configure the voting machines at the time of their deployment. In addition, the session information is encrypted using the public key for each voting machine. The session information may include such items as a ballot to be rendered and displayed to the voter, the identity of one or more datastores for storing the resulting data store, and a public key for the associated tabulation machine that will tabulate the results.

Once the voting machines are deployed (e.g. transported to a polling station, powered on, and provided with network connectivity, among other steps), the voting service downloads the session information to each machine. Since the session information was encrypted with each voting machine's public key prior to being downloaded, only the correct voting machine can decrypt it successfully with its private key. The voting machine does so during its setup procedure when being readied to host a voting session.

During the voting stage, users supply their votes to the voting machines by way of touch input, mouse clicks, stylus input, spoken commands, or any other suitable form of user input. In some cases, the voters may vote manually using punch cards, ink, or other analog measures. Their votes may then be converted into a digital record by scanning the analog record into an electronic voting machine.

The voting machines encrypt the voting data using the public key of the tabulation machine included in the session information each machine received. Each machine also uploads the encrypted voting data to the secure datastore(s) identified in the session information. When the results of a vote are to be determined, the tabulation machine selected for the task retrieves the voting data from the appropriate datastore(s). Because the voting data has been encrypted using the public key of the tabulation machine, only that tabulation machine (or machines, in the cases of multiple tabulation machines), may successfully decrypt the voting data.

In some scenarios, the tabulation machine decrypts and tabulates the results entirely in memory, to prevent the results from being tampered with in persistent or long-term storage. In any case, the results may be output to the appropriate personnel or other such destinations from where it may be published or otherwise distributed.

In some implementations, a paper record of each vote may be printed locally, proximate to a voting machine (e.g. at the same polling station). In some cases, the voting data may be sent to a secure printing facility proximate to or remote from the polling station. The voting machines may also be capable of sending copies of each vote to duplicate locations to ensure their integrity. Thus, the voting data may be available for auditing purposes to ensure that the tabulation machines performed properly.

FIG. 1 illustrates operational architecture 100 for implementing enhanced electronic voting in an embodiment. Operational architecture 100 includes a voting service 101, administrative end-points represented by end-point 105, reporting end-points represented by end-point 107, and voting machines represented by voting machine 111, voting machine 131, and voting machine 141. Voting service 101 includes various datastores represented by datastore 121 and datastore 122. Voting service 101 also includes one or more tabulation machines, represented by tabulation machine 123 and 127.

Figure 9:
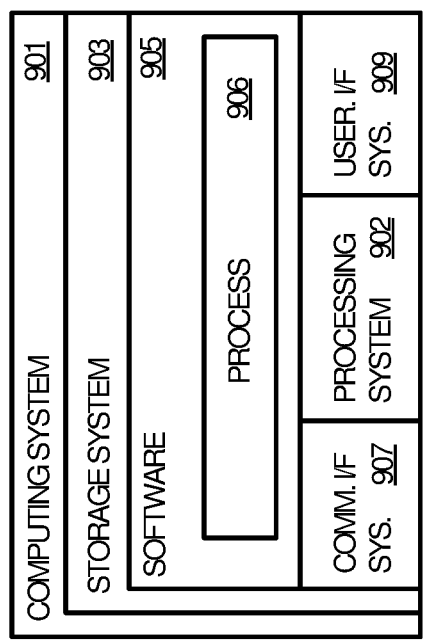
FIG. 9 illustrates a computing system suitable for implementing the voting technology disclosed herein, including any of the architectures, processes, operational scenarios, and operational sequences illustrated in the Figures and discussed below in the Technical Disclosure.

Voting service 101 provides a front-end presence to administrative end-points through which elections, polls, and other voting sessions may be configured. For example, election personnel may login to voting service 101 to enter or upload ballot questions, establish voting parameters, or otherwise setup their voting session. Voting service 101 also provides a portal to reporting end-points through which the results of a given vote may be obtained. Voting service 101 may be implemented as a stand-alone service or it may be integrated with other services of any type. Voting service 101 may be implemented in one or more data centers, represented by data center 103, and on one or more computing systems, of which computing system 900 in FIG. 9 is representative. Voting service 101 may be implemented the cloud, such as in a private cloud environment, public cloud environment, or in a hybrid environment. In some embodiments, voting service 101 may be referred to as a cloud voting system or service.

Voters participate in the election, poll, or other such voting session via voting machines that communicate with voting service 101. Voting machines 111, 131, and 141 are each representative of any computing device capable of communicating with voting service 101 and interfacing with voters. In some implementations, voting machines 111, 131, and 141 may be of the type specifically built for and dedicated to electronic voting. In other implementations, voting machines 111, 131, and 141 may be more general-purpose devices having electronic voting capabilities included therein, such as personal computers, smart phones, tablets, or any other suitable computing device. In either case, computing system 900 in FIG. 9 is representative of such devices.

Votes are stored in one or more datastores until the time at which they are retrieved and counted by one or more tabulation machines. Datastore 121 and datastore 122 may each be a database, a table, a partition thereof, or other such datastore capable of holding encrypted voting data. Datastore 121 and datastore 122 may be co-located relative to each other or located remotely from each other. In addition, datastore 121 and datastore 122 may have one or more backups. The datastores themselves may be backed-up in some implementations, or the voting machines may send their encrypted voting data to multiple datastores in other implementations.

Voting service 101 employs a provisioning process 200 in various implementations, to provision one or more voting sessions. Provisioning process 200 may be implemented in program instructions in the context of any of the software applications, modules, components, or other such program elements that comprise voting service 101. The program instructions direct the underlying physical or virtual computing system or systems that provide voting service 101 to operate as follows.

In operation, voting service 101 receives configuration information from one or more administrative end-points in relation to a given voting session (step 201). The configuration information may be provided by personnel charged with administrating an election, poll, or other such voting session. The configuration information may be received via a secure communication channel established between an end-point and the service. In some implementations, an end-point may present a user interface through which the administrative personnel are able to upload, generate, or otherwise specify a configuration.

In some implementations, the configuration information may include the specific ballot questions to render on an electronic ballot. The configuration information may also include the identity of the specific voting machines that may be deployed in support of the voting session. In other examples, the specific voting machines are identified after the configuration information is received. In either case, the specific voting machines to be used for a given voting session are known by voting service 101.

Next, voting service 101 pairs the voting machines with one or more tabulation machines that may be used to tabulate the results of the voting session (step 203). This may include, for example, identifying one or more tabulation machines to use for a given voting session and recording the identity of the tabulation machine(s) in the configuration information received and maintained for the voting session.

At this point, voting service 101 has obtained configuration information for the voting session from administrative personnel and has supplemented the configuration information with the identity of the tabulation machine(s) to be used for tabulating the results of the voting session. The identity of the voting machines to be used may be provided by the administrative personnel when interfacing with voting service 101, but may also be known to voting service 101 by some other mechanism. For instance, an entity associated with voting service 101 or a third-party may provide the voting machines and thus their identities.

In preparation for conducting a voting session, each voting machine communicates with voting service 101 to obtain session information for the session with which to configure and setup its operating environment. The requests identify the specific voting session that the voting machine is supporting and also provides the identity of the voting machine. Voting service 101 receives the requests (step 205) and populates the session information on a per-machine/per-request basis (step 207).

For example, in response to a given request, voting service 101 identifies the ballot to be deployed for the associated voting session. Voting service 101 also identifies the tabulation machine that was paired earlier with the voting machine making the request. Lastly, voting service 101 identifies one or more datastores that will be used to store the voting data produced by the voting machine.

A single datastore may be configured to store all of the voting data associated with a given ballot (e.g. all of the answers to all of the ballot questions on a ballot). In other implementations, multiple datastores may be configured to store duplicate versions of all of the voting data associated with a ballot. In still other implementations, the voting data for a ballot may be distributed across multiple datastores, such that the answers to ballot questions on a ballot are stored in different datastores relative to each other. In any case, identifying information for the datastore(s) is included in the session information that is prepared by voting service 101.

In addition to datastore information, voting service 101 also stores the public key of a public-private key pair for tabulation machine to be associated with the requesting voting machine. The public key for the tabulation machine is also included in the session information that is prepared and held by voting service 101.

Once the session information has been prepared, voting service 101 encrypts the voting information using the public key of a public-private key pair associated with the requesting voting machine (step 209). That is, the ballot information, datastore information, and public key for the tabulation machine (but not its identity) are all encrypted using the voting machine's public key. It may be appreciated that the session information is encrypted differently for each request, as each voting machine has a different public key. Thus, the session information may only be decrypted successfully by the voting machine that possesses the corresponding private key. Having encrypted the session information, voting service 101 replies to each request with the encrypted session information (step 211).

Figure 3:
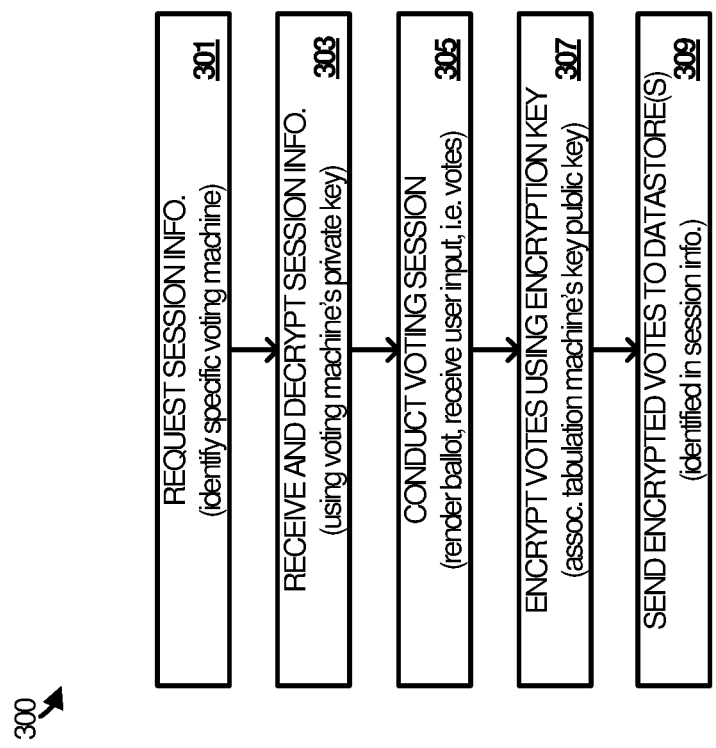
FIG. 3 illustrates a deployment process employed by an electronic voting machine in embodiments of enhanced electronic voting.
Figure 4:
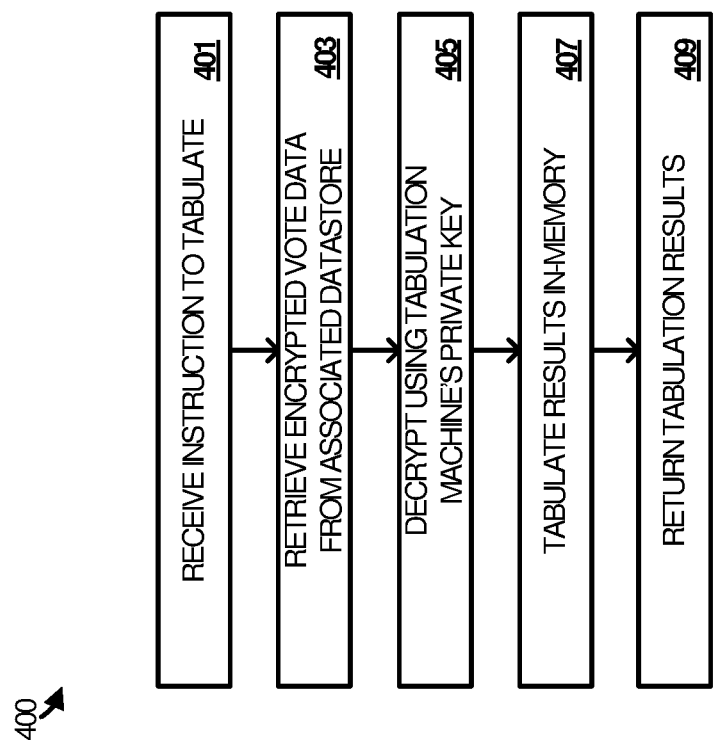
FIG. 4 illustrates a tabulation process employed by a tabulation machine in embodiments of enhanced electronic voting.

Referring now to FIG. 3, voting machines 111, 131, and 141 each employ a deployment process 300 in various implementations, in the context of supporting one or more voting sessions. Deployment process 300 may be implemented in program instructions in the context of any of the hardware, firmware, software applications, modules, components, or other such program elements that comprise each electronic voting machine. The program instructions direct the electronic voting machines to operate as follows.

In operation, a given voting machine is deployed to be used with respect to one or more voting sessions, such as an election, a poll, or any other type of vote. The voting machine may be deployed to a specific physical location, such as a polling station. As part of the deployment process, the voting machine requests session information from voting service 101 (step 301). The voting machine may request the session information automatically upon powering on. Alternatively, the voting machine may request the session information upon being prompted to do so by user input. For example, a voting application running on the voting machine may allow a technician to configure the voting machine for the session. Once appropriate network connectivity has been established, the application may be capable of communicating with voting service 101 over the Internet (or any other communication channel) to obtain the session information.

The request for session information may include information that identifies the voting machine to voting service 101. The information may be, for example, a media access control (MAC) address associated with the voting machine. Alternatively, the voting machine may have been assigned a device identifier (ID) when manufactured, at the time of deployment to the polling station, or at any other time. The voting machine's identity may be known or readily accessible by the voting application running on the voting machine. The identity of the voting machine allows voting service 101 generate and encrypt the session information appropriately.

The voting machine receives the session information from voting service 101 in its encrypted state (step 303). As such, the voting machine must first decrypt the session information using its private key. The voting machine's private key may have been provisioned in hardware in the voting machine at the time of manufacture. Alternatively, the private key may be provided to the voting machine at the time of deployment. In still other embodiments, the private key may be communicated to the voting machine once it has established appropriate network connectivity. In any case, the private key may be provided by voting service 101, by a third-party authority, or any other key repository.

Having decrypted the session information, the voting machine now be configured to conduct the voting session (step 305). Conducting the voting session may include, for example, rendering a ballot and ballot questions in a user interface. User input may also be supplied via the user interface to express a given user's vote on each ballot question. The votes may be supplied through any of a variety of user input mechanisms, including touch input, mouse clicks, stylus input, spoken commands, or the like.

Next, the voting machine encrypts the votes using the public key provided in the session information (step 307). In this manner, only the specific tabulation machine associated with the voting session and/or the voting machine is capable of successfully decrypting the voting data. The voting data may be stored and encrypted in a variety of ways with respect to the combinations of voters and ballot questions that are possible. For example, each individual voter's data (his or answers to the ballot questions on a ballot) may be stored and encrypted separately from that of other voters, e.g. in its own file. Alternatively, all of the data for all of the voters may be stored and encrypted together (e.g. in the same file or record). The encryption may be performed after the voting data has been written to a given file or prior to the voting data has been to the file (e.g. in-memory). A variety of storage and encryption mechanisms are possible and may be considered within the scope of the present disclosure.

Having encrypted the voting data with the public key of an associated tabulation machine, the voting machine proceeds to send the voting data to one or more datastores specified in the session information (step 309). The datastore(s) may be identified by way of a table identifier, a web address (e.g. URI/URL), or any other information suitable for identifying a datastore. In some implementations, the session information identifies a global datastore and from there, the encrypted data may be routed to one or more specific datastores. Alternatively, the session information may identify the specific data stores such that the encrypted data may be routed directly to them. While the voting data itself is encrypted, the voting machine may also communicate with the datastore over a secure channel using any suitable technology, such as HTTPS.

In some cases, the specific datastore may be provided to the voting machine after the fact, once voting has begun, as opposed to including the identity of the datastore in the initial session information. For example, the voting machine may attempt to upload encrypted voting data to voting service 101. In reply, voting service 101 may return identifying information for the specific datastore to which the voting machine should send the encrypted voting data.

In still other scenarios, the session information may identify voting service 101 itself as the datastore for a given voting machine. The voting machine may thus upload the encrypted voting data to a front-end element in voting service 101. The front-end element may then route the data to one or more datastores selected for that particular voting session. In other words, the voting machine need not always connect to and communicate directly with the actual datastore that functions as the repository for its voting data. Rather, voting service 101 or some other service may provide routing functionality to allow the identity of the datastore(s) to remain transparent or hidden to the voting machine.

Tabulation machines 123 and 127 each employ a tabulation process 400 in various implementations, in the context of tabulating the results of one or more voting sessions. Tabulation process 400 may be implemented in program instructions in the context of any of the hardware, firmware, software applications, modules, components, or other such program elements that comprise each tabulation machine. The program instructions direct the electronic voting machines to operate as follows.

In operation, a given tabulation machine is designated to tabulate some or all of the results for a voting session, such as an election, a poll, or the like. Voting data for the voting session is generated by the various voting machines that were deployed and associated with the tabulation machine ahead of the voting session. Once polls have closed (or voting has otherwise stopped), the tabulation machine receives an instruction to tabulate the results of the vote (step 401). The instruction may originate from another system or service within voting service 101 or from a third-party service. In some scenarios, the instruction is provided within the larger context of an authentication and authorization process that ensures that only authorized personnel are able to initiate the tabulation process.

In response to a valid request, the tabulation machine retrieves the encrypted voting data from the relevant datastore (step 403). Tabulation machine may obtain the identity of the datastore from another system or service within voting service 101. Alternatively, the relevant datastore may be identified in the tabulation request. For example, the tabulation request may identify a table name, a web address, or the like. In other examples, the tabulation machine may request the voting data using an identity of a voting session included in the tabulation instruction, in which case a routing service may connect the tabulation machine to the appropriate datastore associated with the identified session.

Once the tabulation machine has retrieved the voting data, the tabulation machines decrypts the data using its own private key (step 405). If the voting data was encrypted with the tabulation machine's public key, then the voting data will be successfully decrypted with the machine's private key. Otherwise, the voting data will be rendered inoperable or invalid.

In some implementations, the decryption step may be performed in-memory in the tabulation machine so that the decrypted data never resides on-disk or other persistent storage. In addition, the results may be tabulated entirely in-memory such that the decrypted data used during the tabulation step never resides on disk (step 407). Alternatively, some or all of the decrypted data could be stored on persistent storage and the decryption and tabulation steps could utilize persistent storage.

The results are eventually returned by the tabulation machine to the source of the tabulation instruction or to any other destination (step 409). The results may be published for election personnel to consume, for example, or communicated to news organizations. In many cases, the results of the vote may need to be reported "up," to be aggregated with the results of other jurisdictions.

Figure 5:
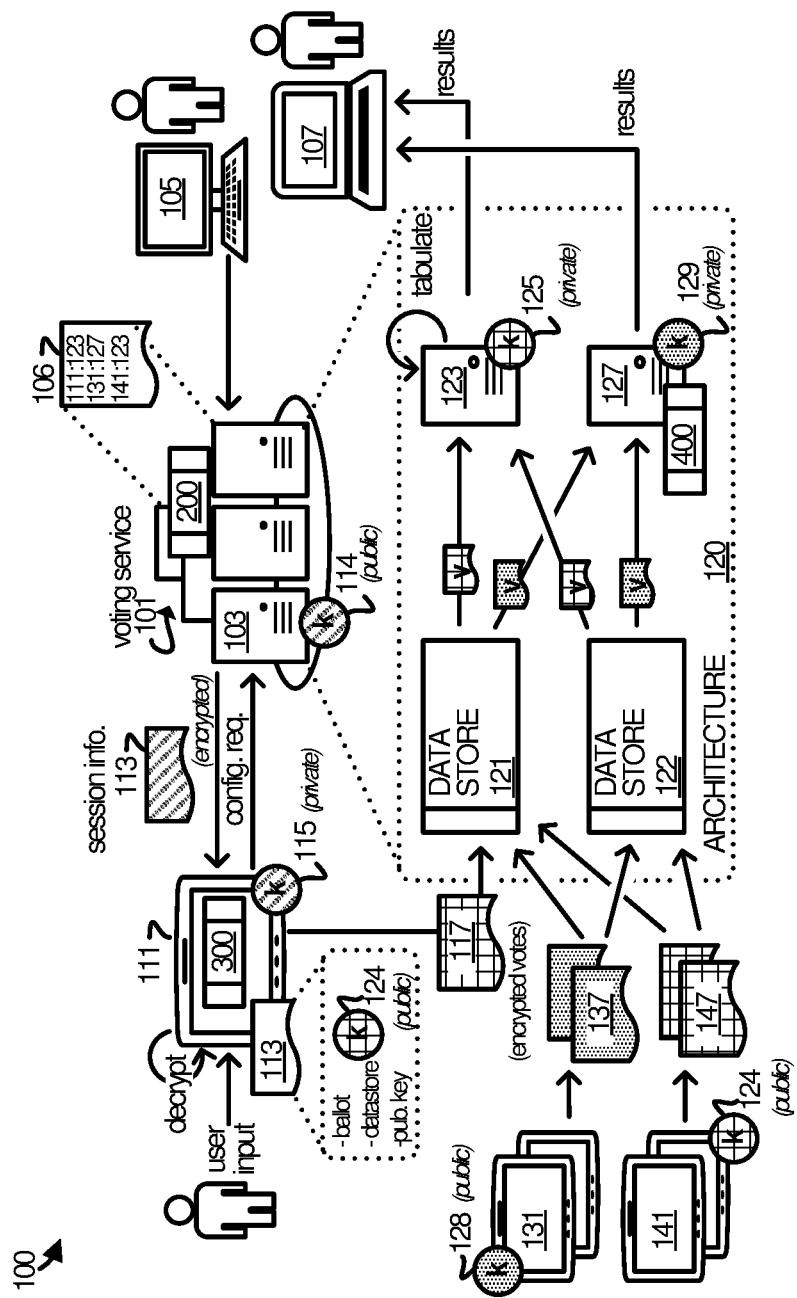
FIG. 5 illustrates an operational scenario in an embodiment of enhanced electronic voting.

FIG. 5 illustrates an operational scenario that may occur with respect to the operational architecture illustrated in FIG. 1, as voting service 101, voting machines 111, 131, and 141, and tabulation machines 123, and 127 employ provisioning process 200, deployment process 300, and tabulation process 400 respectively.

In operation, personnel associated with end-point 105 interface with voting service 101 to setup a voting session. The voting session may comprise, for example, a local election, a regional election, a supra-regional election, or the like. The personnel may upload ballots, ballot questions, or any other information that may be relevant to carrying out the voting session. In this example scenario, the actual voting machines that are to be deployed in support of the election are known to the personnel. Accordingly, the personnel provide the identity of the machines to voting service 101 when configuring the election.

Voting machines are then deployed to carry out the actual elections operations. Assuming a supervised environment for exemplary purposes, the voting machines are setup at a polling station by personnel associated with the election, by personnel associated with voting service 101, or by third-party personnel (e.g. consultants).

As part of the setup procedure, the voting machines request session information from voting service 101. The requests include the identities of the voting machines, so that voting service 101 can generate the appropriate session information. This includes retrieving the appropriate ballot for the voting machine, identifying the appropriate datastore, and identifying the appropriate tabulation machine.

Once known, voting service 101 may encrypt the session information individually for each voting machine. In this example, configuration information 106 indicates that voting machines 111 and 141 have been associated with tabulation machine 123, while voting machine 131 has been associated with tabulation machine 127. Accordingly, session information 113 is encrypted with the public key 114 associated with voting machine 111, while the session information sent to voting machine 131 and voting machine 141 is encrypted with their respective public keys. Thus, only the voting machine for which the session information is intended can successfully decrypt the session information using its own private key. For example, voting machine 111 is able to decrypt the session information with its private key 115.

The session information delivered to each voting machines includes ballot information, the identity of the datastore to which voting data should be sent, and the public key of the tabulation machine associated with the voting machine. Once the session information is decrypted, the voting machines can use the public key of their associated tabulation machine to encrypt voting data. The voting data may then be sent to the datastore identified in the session information.

For example, voting machine 111 receives user input from voters in the form of touch input, key strokes, mouse clicks, or the like, expressing a given voter's preference with respect to the various ballot questions that may be on a ballot 113. Voting machine 111 encrypts the voting data using the public key 124 of its associated tabulation machine (tabulation machine 123). Voting machine 111 then communicates the encrypted voting data to datastore 121, as specified in its session information.

In contrast, voting machine 131 encrypts its voting data with public key 128, which is the public key for tabulation machine 127. In addition, voting machine 131 is directed to send some of its voting data to storage location 121 and some of its voting data to storage location 122. However, while the voting data is sent to multiple datastores, it is encrypted only with the public key associated with tabulation machine 127.

Voting machine 141 also sends its voting data to multiple datastores (datastore 121 and datastore 122). However, its voting data is encrypted with the public key 124 associated with tabulation machine 123. Accordingly, only tabulation machine 123 can decrypt its voting data successfully.

At tabulation time, tabulation machine 123 receives an instruction to tabulate the results of a given voting session. Tabulation machine 123 responsively retrieves the voting data associated with the voting session from the respective datastore(s) in which it is stored. For exemplary purposes, it is assumed that tabulation machine 123 is tasked with counting the votes cast by voters using voting machine 111 and voting machine 141 (and the other voting machines that they may represent).

A portion of the voting data for the voting session is stored in datastore 121, while another portion of the voting data is stored in datastore 122. Tabulation machine 123 therefore retrieves the data from both locations and decrypts the data using its private key 125. Private key 125 may be provided to tabulation machine 123 at the time of manufacture, at the time of deployment, or at some other interval. For instance, private key 125 may be provided to tabulation machine 123 by another sub-system or service within voting service 101 during the setup process for the voting session. Alternatively, private key 125 may be provided to tabulation machine 123 by a third-party sub-system or service.

Tabulation machine 123 proceeds to decrypt the voting data and tabulates it in-memory. The results of the tabulation may be provided to end-point 107, or any other end-point. The results may be published to a web page, a print-out, or any other suitable destination through which the results of the voting session may be known.

Tabulation machine 127 may also receive an instruction to tabulate the results of a given voting session. Tabulation machine 127 responsively retrieves the voting data associated with the voting session from the respective datastore(s) in which it is stored. For exemplary purposes, it is assumed that tabulation machine 127 is tasked with counting the votes cast by voters using voting machine 131 (and the other voting machines that it may represent).

A portion of the voting data for the voting session is stored in datastore 121, while another portion of the voting data is stored in datastore 122. Tabulation machine 123 therefore retrieves the data from both locations and decrypts the data using its private key 129. Private key 129 may be provided to tabulation machine 127 at the time of manufacture, at the time of deployment, or at some other interval. For instance, private key 129 may be provided to tabulation machine 127 by another sub-system or service within voting service 101 during the setup process for the voting session. Alternatively, private key 129 may be provided to tabulation machine 127 by a third-party sub-system or service.

Tabulation machine 127 proceeds to decrypt the voting data and tabulates it in-memory. The results of the tabulation may be provided to end-point 107, or any other end-point. The results may be published to a web page, a print-out, or any other suitable destination through which the results of the voting session may be known.

Figure 6:
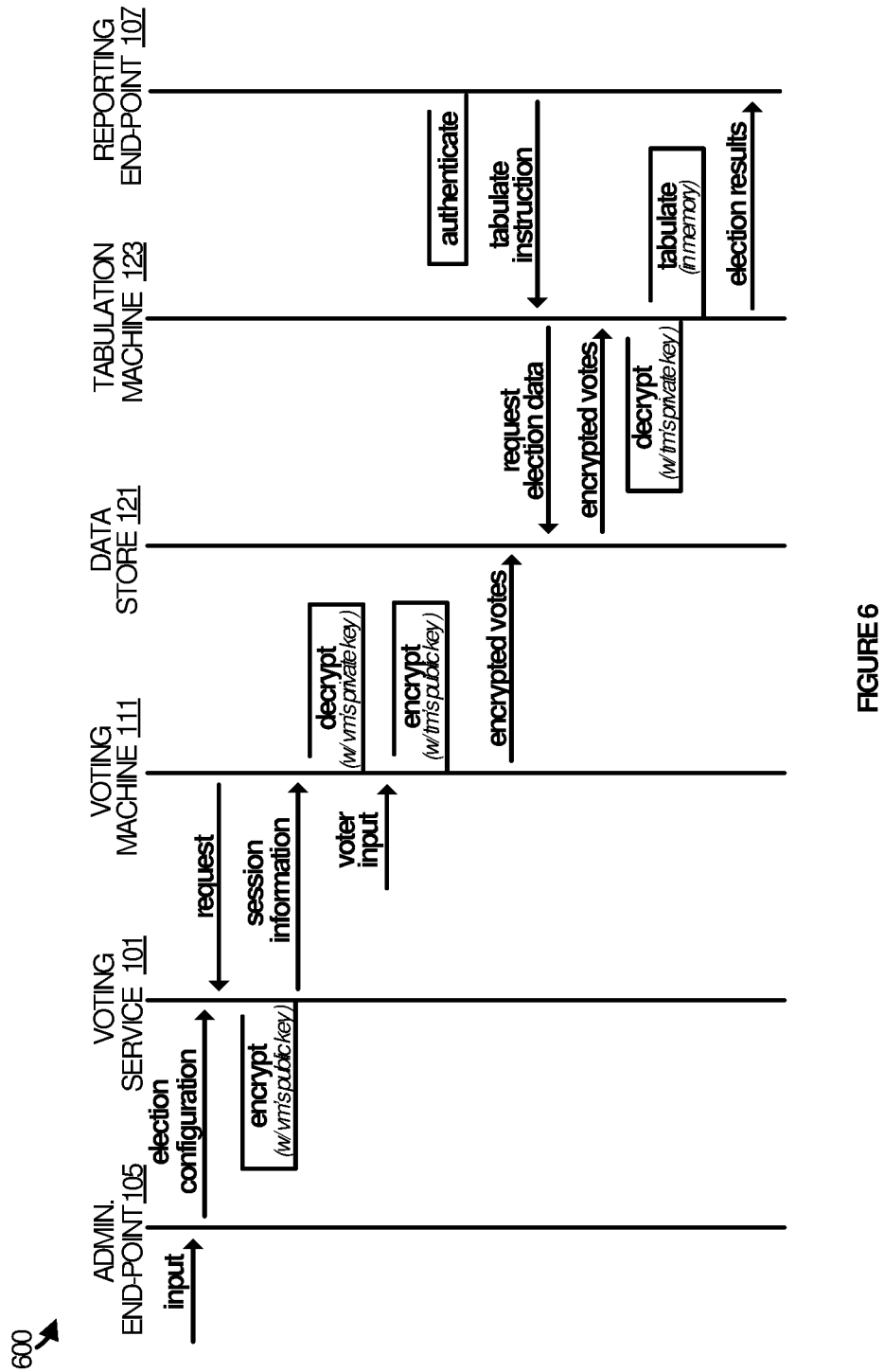
FIG. 6 illustrates an operational sequence in an embodiment of enhanced electronic voting.

FIG. 6 illustrates an operational sequence 600 related to operational architecture 100 to better understand the timing involved in enhanced electronic voting. As depicted, administrative personnel operating end-point 105 supply user input in order to setup and configure a new voting session. The election configuration is maintained by voting service 101 and may be distributed to the various voting machines engaged in the election.

Voting machines are then deployed to polling stations and setup in support of the election. The voting machines, of which voting machine 111 is representative, request session information from voting service 101. The requests may be made over secure channels using suitable web encryption tools, such as HTTPS.

Voting service 101 receives the requests and encrypts the session information individually for each voting machine. The session information is encrypted using the public key associated with the voting machine, so that only that voting machine may successfully decrypt it. Voting service 101 sends the encrypted session information to the requesting voting machines, e.g. voting machine 111.

The voting machines proceed to decrypt their session information using their own individual private keys. The session information includes ballot information with which to render an electronic ballot in a user interface. Voters at the polling station supply their votes via user input to the voting machines, generating voting data that is representative of their answers to the various ballot questions on the ballot.

The session information also includes a public key for a specific tabulation machine that was a priori selected to process the voting data generated by a given voting machine. The voting machines thus encrypt their voting data with the public key delivered in their session information. For example, voting machine 111 encrypts its voting data with the public key for tabulation machine 123.

The encrypted voting data is then uploaded to the respective datastore identified in the session information sent to the voting machines. Voting machine 111 sends its data to datastore 121, for example, although it may be directed to send its voting data to more than one datastore. The voting machines communicate the voting data over secure communication channels, such as HTTPS sessions established between the voting machines and the datastores or front-end systems or services that may exist between the voting machines and the datastores.

Once the election is over, one or more reporting endpoints, represented by end-point 107, may be used to trigger the tabulation process. Advanced authentication and authorization protocols may be employed to ensure the identity of the people driving the tabulation process. For instance, biometric security measures may be employed to ensure the identity of an election commissioner or other authorities. In some scenarios, multiple people must authorize a tabulation process before it can proceed.

Assuming all of the security requirements are satisfied, a tabulation instruction is issued from end-point 107 or some other system or service to tabulation machine 123. The tabulation instruction may identify the election for which tabulation is sought, allowing it to request the correct voting data from datastore 121. Alternatively, tabulation machine 123 may communicate with another system or service within voting service 101 to obtain the identify of the datastore that houses the relevant voting data.

In any case, tabulation machine 123 eventually connects to datastore 121 over a secure communication channel and retrieves the relevant voting data. The voting data, having been encrypted with the tabulation machine's public key, may only be successfully decrypted by that tabulation machine. Accordingly, tabulation machine 123 proceeds to decrypt the data and calculate the results of the one or more ballot questions that may have been the subject of the election. The tabulation may occur in-memory such that the voting data in its decrypted form is not persisted on-disk.

Tabulation machine 123 provides the results of the tabulation to end-point 107 or to any suitable destination. The results may be the complete results of a given election or they many need to be aggregated with other results tabulated by other machines. The aggregation may be automated in some cases or may proceed manually.

Figure 7:
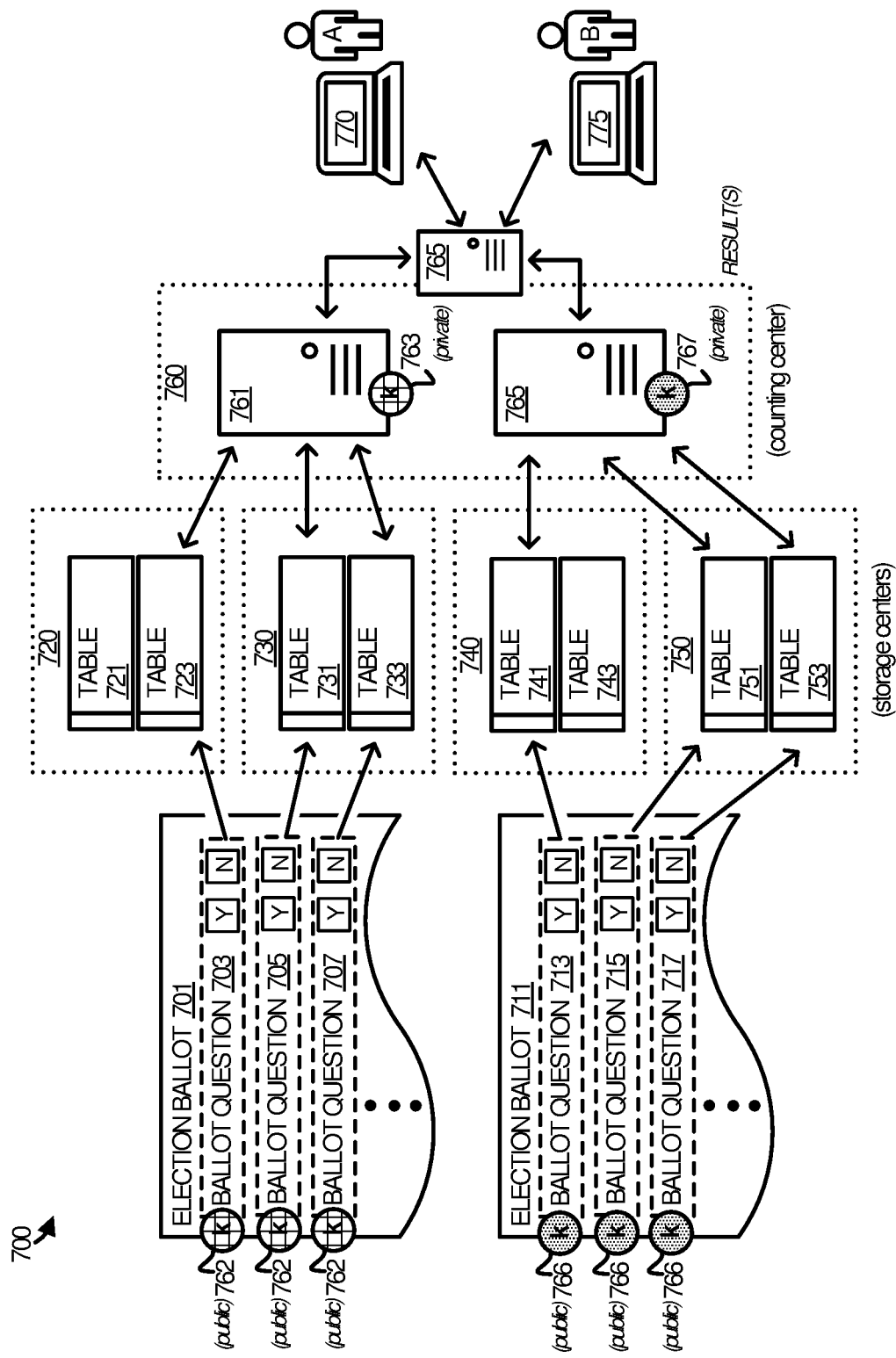
FIG. 7 illustrates an operational architecture and associated scenario in an embodiment of enhanced electronic voting.

FIG. 7 illustrates another operational architecture and related scenario to depict other aspects of the enhanced electronic voting contemplated herein. Operational architecture 700 includes election ballots 701 and 711. Election ballots 701 and 711 are representative of the ballots that may be rendered by voting machines (not shown). The ballots include ballot questions on which voters may vote. For example, election ballot 701 includes ballot question 703, ballot question 705, and ballot question 707, while election ballot 711 includes ballot question 713, ballot question 715, and ballot question 717.

In this illustration, the session information provided to each voting machine identifies a datastore on a per-question basis. The session information also identifies a public key on a per-question basis for encrypting the votes corresponding to each question. The answers to ballot question 703 are thus encrypted with public key 762, which corresponds to tabulation machine 761, and the answers are uploaded to table 723 in storage center 720. In contrast, the answers to ballot question 705 and to ballot question 707 are sent to table 731 and table 733 respectively in storage center 730, although the answers to both are also encrypted with public key 762.

The answers to the ballot questions on ballot 711 are sent to different datastores and are encrypted with a different public key relative to those on ballot 701. The answers to ballot question 713 are encrypted with public key 766, which corresponds to tabulation machine 765. The answers are uploaded to table 741 in storage center 740. The answers to ballot question 715 are also encrypted with public key 766, but are sent to table 751 in storage center 750. Similarly, the answers to ballot question 717 are encrypted with public key 766, but are uploaded to table 753.

It may be appreciated that the remaining tables 721 and 743 may be used to store the answers to other ballot questions (not shown) on the same or other ballots.

At tabulation time, various personnel that may be operationally associated with the ballots or ballot questions interface with a front-end service provided by server 765 in order to obtain the results of a given vote. As an example, personnel A may login via an end-point 770, while personnel B may login via endpoint 775. The front-end service may provide the election personnel with a portal through which to commence vote counting and through which to obtain the results of a vote.

To tabulate a set of votes, the front-end service first identifies the ballot question or questions that may be relevant to the personnel. Knowing this, the front-end service determines which tabulation machine was associated with the subject ballot question or questions. The service then communicates with the tabulation machine to trigger the tabulation process. Identifying information may be provided to the tabulation machine to allow it to retrieve the correct voting data, such as the location of the voting data. Alternatively, identifying meta-data is provided to the tabulation machine with which it may look-up the proper datastore or communicate with another sub-system or service to identify the proper datastore.

In a brief example, personnel A may be interested in the results of ballot question 705. Accordingly, tabulation machine retrieves the encrypted voting data from table 731, which is the table where the answers to ballot question 705 were stored. Tabulation machine 761 decrypts the voting data in-memory using its private key 763 and tabulates the election results. The election results may then be provided directly or indirectly to end-point 770 or any other appropriate destination. A similar process would ensue if personnel desired the results of ballot question 703 and ballot question 707, except that the voting data would be retrieved from table 723 and table 733 respectively, rather than table 731.

In another brief example, personnel B may be interested in the results of ballot question 715. Accordingly, tabulation machine 765 retrieves the encrypted voting data from table 751, which is the table where the answers to ballot question 715 were stored. Tabulation machine 765 decrypts the voting data in-memory using its private key 767 and tabulates the election results. The election results may then be provided directly or indirectly to end-point 775 or any other appropriate destination. A similar process would ensue if personnel desired the results of ballot question 713 and ballot question 717, except that the voting data would be retrieved from table 741 and table 753 respectively, rather than table 741.

Figure 8:
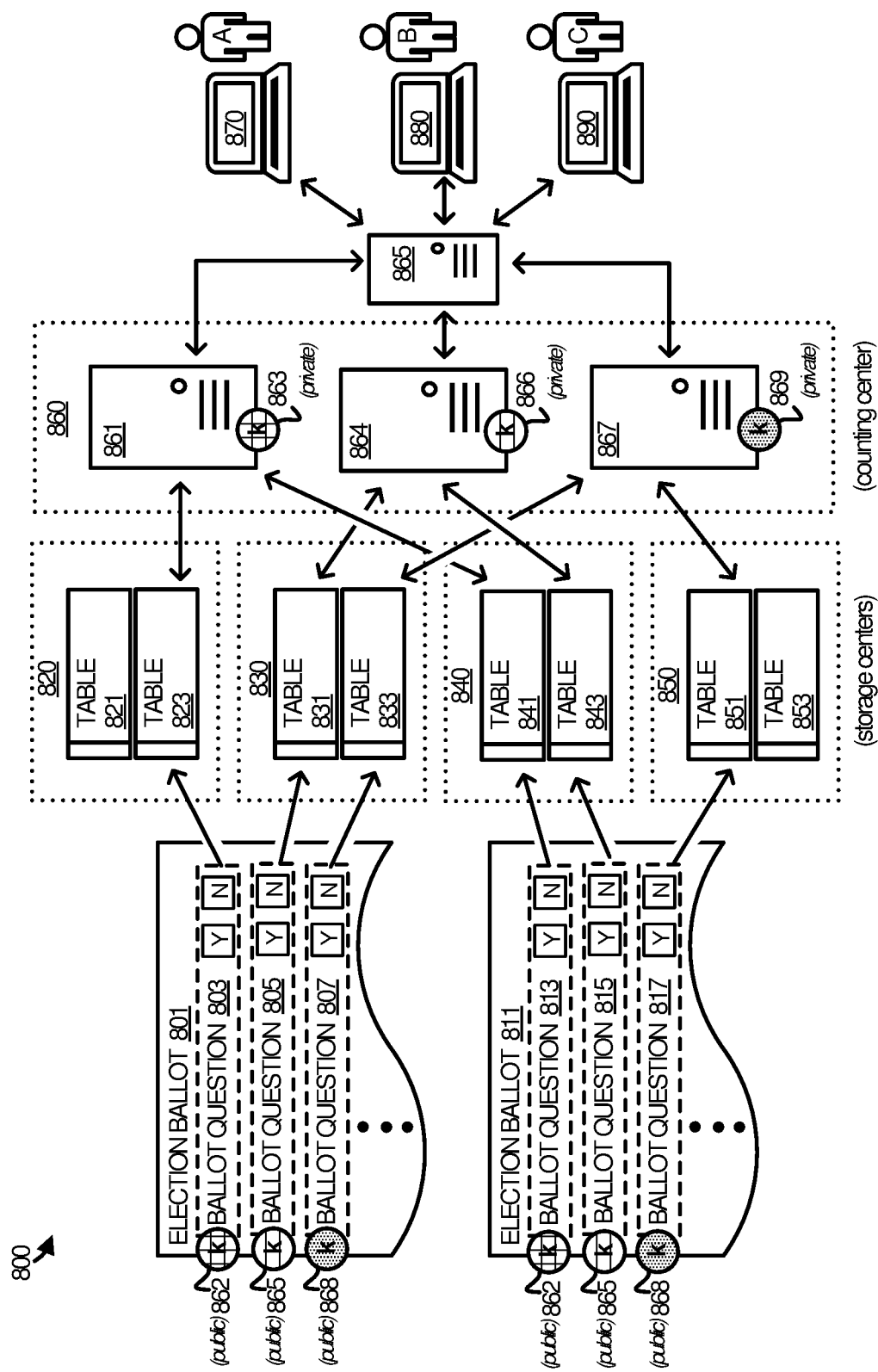
FIG. 8 illustrates an operational architecture and associated scenario in an embodiment of enhanced electronic voting.

FIG. 8 illustrates operational architecture 800 and a related scenario to depict additional aspects of the enhanced electronic voting contemplated herein. Operational architecture 800 includes election ballot 801 and 811. Election ballots 801 and 811 are representative of the ballots that may be rendered by voting machines (not shown). The ballots include ballot questions on which voters may vote. For example, election ballot 801 includes ballot question 803, ballot question 805, and ballot question 807, while election ballot 811 includes ballot question 813, ballot question 815, and ballot question 817.

In this illustration, the session information provided to each voting machine identifies a datastore on a per-question basis. The session information also identifies public keys on a per-question basis for encrypting the votes corresponding to each question. The answers to ballot question 803 are thus encrypted with public key 862, which corresponds to tabulation machine 861, and the answers are uploaded to table 823 in storage center 820. In contrast, the answers to ballot question 805 are encrypted with public key 865 associated with tabulation machine 864 and are uploaded to table 831 in storage center 830. The answers to ballot question 807 are encrypted with public key 868 associated with tabulation machine 867 and are uploaded to table 841 in storage center 840.

With respect to election ballot 811, the answers to ballot question 813 are encrypted with public key 862 and are also sent to table 841. In other words, ballot question 807 on election ballot 801 and ballot question 813 on election ballot 811 may pertain to the same election, such as a national political election or the like. The other ballot questions may pertain to local or regional elections, for example.

Continuing with election ballot 811, the answers to ballot question 815 are encrypted with public key 865 and are uploaded to table 843. The answers to ballot question 817 are encrypted with public key 868 and are stored in table 851. It may be appreciated that the remaining tables 821, 833, and 853 may be used to store the answers to other ballot questions (not shown) on the same or other ballots.

At tabulation time, various personnel that may be operationally associated with the ballots or ballot questions interface with a front-end service on server 865 in order to obtain the results of a given vote. As an example, personnel A may login via end-point 870, while personnel B may login via end-point 880, personnel C may login via end-point 890. The front-end service may provide the election personnel with a portal through which to commence vote counting and through which to obtain the results of a vote.

To tabulate a set of votes, the front-end service first identifies the ballot question or questions that may be relevant to the personnel. Knowing this, the front-end service determines which tabulation machine was associated with the subject ballot question or questions. The service then communicates with the tabulation machine to trigger the tabulation process. Identifying information may be provided to the tabulation machine to allow it to retrieve the correct voting data, such as the location of the voting data. Alternatively, identifying meta-data is provided to the tabulation machine with which it may look-up the proper datastore(s) or communicate with another sub-system or service to identify the proper datastore(s).

In a brief example, personnel A may be interested in the results of an election that was manifested through ballot question 803 on election ballot 801 and ballot question 813 on election ballot 811. Accordingly, tabulation machine 861 retrieves the encrypted voting data from table 823 and table 841, which are the tables where the answers to the relevant ballot questions were stored. Tabulation machine 861 decrypts the voting data in-memory using its private key 863 and tabulates the election results. The election results may then be provided directly or indirectly to end-point 870 or any other appropriate destination.

In another brief example, personnel B may be interested in the results of an election that was manifested through ballot question 805 on election ballot 801 and ballot question 815 on election ballot 811. Accordingly, tabulation machine 864 retrieves the encrypted voting data from table 831 and table 815, which are the tables where the answers to the relevant ballot questions were stored. Tabulation machine 864 decrypts the voting data in-memory using its private key 866 and tabulates the election results. The election results may then be provided directly or indirectly to end-point 880 or to any other appropriate destination.

In still another brief example, personnel C may be interested in the results of an election that was manifested through ballot question 807 on election ballot 801 and ballot question 817 on election ballot 811. Accordingly, tabulation machine 867 retrieves the encrypted voting data from table 833 and table 851, which are the tables where the answers to the relevant ballot questions were stored. Tabulation machine 867 decrypts the voting data in-memory using its private key 869 and tabulates the election results. The election results may then be provided directly or indirectly to end-point 890 or any other appropriate destination.

FIG. 9 illustrates computing system 901, which is representative of any system or collection of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909 (optional).

Processing system 902 loads and executes software 905 from storage system 903. Software 905 includes process 906, which is representative of the processes discussed with respect to the preceding FIGS. 1-8, including provisioning process 200, deployment process 300, and tabulation process 300. When executed by processing system 902 to enhance electronic voting, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, graphical processing unites, application specific processors, and logic devices, as well as any other type of processing device, combination, or variation.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing provisioning process 200, deployment process 300, and tabulation process 300.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system to enhance electronic voting. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating an electronic voting system, the method comprising:
   in a voting machine, sending a request for session information to a session configuration service, wherein the request comprises a device identifier unique to the voting machine;
   in the voting machine, receiving, from the session configuration service, the session information in an encrypted state for conducting a voting session, wherein the session information is encrypted using a public key for the voting machine and comprises:
   ballot information with which to render an electronic ballot;
   a first public key associated with a first section of the electronic ballot, wherein the first public key comprises one-half of an asymmetric key pair associated with a first tabulation machine;
   a second public key associated with a second section of the electronic ballot, wherein the second public key comprises one-half of an asymmetric key pair associated with a second tabulation machine;
   an identity of a first datastore for storing a first portion of votes cast in association with the electronic ballot; and
   an identity of a second datastore for storing a second portion of the votes cast in association with the electronic ballot;
   in the voting machine, decrypting the session information using a private key for the voting machine;
   in the voting machine, presenting the first section of the electronic ballot in a user interface and receiving votes cast in association with the first section of the electronic ballot through the user interface;
   in the voting machine, presenting the second section of the electronic ballot in the user interface and receiving votes cast in association with the second section of the electronic ballot through the user interface;
   in the voting machine, encrypting the votes cast in association with the first section of the electronic ballot with the first public key to generate a first set of encrypted votes;
   in the voting machine, encrypting the votes cast in association with the second section of the electronic ballot with the second public key to generate a second set of encrypted votes;
   in the voting machine, sending the first portion of the votes to the first datastore, wherein the first portion of the votes comprises at least a portion of the first set of encrypted votes and a second portion of the second set of encrypted votes; and
   in the voting machine, sending the second portion of the votes to the second datastore, wherein the second portion of the votes comprises at least a portion of the second set of encrypted votes and a second portion of the first set of encrypted votes;
   wherein the first tabulation machine retrieves, for tabulation, the portion of the first set of encrypted votes from the first datastore and the second portion of the first set of encrypted votes from the second datastore; and
   wherein the second tabulation machine retrieves, for tabulation, the portion of the second set of encrypted votes from the second datastore and the second portion of the second set of encrypted votes from the first datastore.

2. The method of claim 1 wherein the device identifier unique to the voting machine is a media access control address and wherein the session configuration service retrieves the session information already in the encrypted state using the device identifier unique to the voting machine.

3. The method of claim 1 wherein:
   the first set of encrypted votes can only be decrypted by the first tabulation machine having stored thereon a first private key, wherein the first private key comprises another one-half of the asymmetric key pair associated with the first tabulation machine; and the second set of encrypted votes can only be decrypted by the second tabulation machine having stored thereon a second private key, wherein the second private key comprises another one-half of the asymmetric key pair associated with the second tabulation machine.

4. The method of claim 3, further comprising:

decrypting the first set of encrypted votes using the first private key; and tabulating the votes cast in association with the first section of the electronic ballot in the first tabulation machine.

5. The method of claim 4, further comprising:

decrypting the second set of encrypted votes using the second private key; and tabulating the votes cast in association with the second section of the electronic ballot in the second tabulation machine.

6. The method of claim 1 wherein each of the first datastore and the second datastore are accessible to the first tabulation machine and the second tabulation machine.

7. A computing apparatus comprising:

one or more computer readable storage media;

a processing system operatively coupled with the one or more computer readable storage media; and program instructions for supporting electronic voting stored on the one or more computer readable storage media that, when executed by the processing system, direct the processing system to at least:

send a request for session information to a session configuration service, wherein the request comprises a device identifier unique to a voting machine sending the request;

receive the session information in an encrypted state for conducting a voting session, wherein the session information is encrypted using a public key for a voting resource and comprises:

ballot information with which to render an electronic ballot;

a first public key associated with a first section of the electronic ballot, wherein the first public key comprises one-half of an asymmetric key pair associated with a first tabulation machine;

a second public key associated with a second section of the electronic ballot, wherein the second public key comprises one-half of an asymmetric key pair associated with a second tabulation machine;

an identity of a first datastore for storing a first portion of votes cast in association with the electronic ballot; and an identity of a second datastore for storing a second portion of the votes cast in association with the electronic ballot;

decrypt the session information using a private key for the voting resource;

present the first section of the electronic ballot in a user interface and receive votes cast in association with the first section of the electronic ballot through the user interface;

present the second section of the electronic ballot in the user interface and receive votes cast in association with the second section of the electronic ballot through the user interface;

encrypt the votes cast in association with the first section of the electronic ballot with the first public key to generate a first set of encrypted votes;

encrypt the votes cast in association with the second section of the electronic ballot with the second public key to generate a second set of encrypted votes; and send the first portion of the votes to the first datastore, wherein the first portion of the votes comprises at least a portion of the first set of encrypted votes and a second portion of the second set of encrypted votes; and sending the second portion of the votes to the second datastore, wherein the second portion of the votes comprises at least a portion of the second set of encrypted votes and a second portion of the first set of encrypted votes wherein the first tabulation machine retrieves, for tabulation, the portion of the first set of encrypted votes from the first datastores and the second portion of the first set of encrypted votes from the second datastore; and wherein the second tabulation machine retrieves, for tabulation, the portion of the second set of encrypted votes from the second datastore and the second portion of the second set of encrypted votes from the first datastore.

8. The computing apparatus of claim 7 wherein the device identifier unique to the voting machine comprises a media access control address and wherein the session configuration service retrieves the session information already in the encrypted state using the identity of the voting resource.

9. The computing apparatus of claim 7 wherein:

the first set of encrypted votes can only be decrypted by the first tabulation machine having stored thereon a first private key, wherein the first private key comprises another one-half of the asymmetric key pair associated with the first tabulation machine; and the second set of encrypted votes can only be decrypted by the second tabulation machine having stored thereon a second private key, wherein the second private key comprises another one-half of the asymmetric key pair associated with the second tabulation machine.

10. The computing apparatus of claim 9, further comprising:

decrypting the first set of encrypted votes using the first private key; and tabulating the votes cast in association with the first section of the electronic ballot in the first tabulation machine.

11. The computing apparatus of claim 10, further comprising:

decrypting the second set of encrypted votes using the second private key; and tabulating the votes cast in association with the second section of the electronic ballot in the second tabulation machine.

12. The computing apparatus of claim 7 wherein each of the first datastore and the second datastore are accessible to the first tabulation machine and the second tabulation machine.

13. A method of conducting a voting session, the method comprising:

in a voting machine, sending a request for session information to a session configuration service, wherein the request comprises a device identifier unique to the voting machine sending the request;

in the voting machine, receiving the session information in an encrypted state for conducting the voting session, wherein the session information comprises:

a ballot having a plurality of ballot questions, wherein each ballot question is associated with a tabulation machine of a plurality of tabulation machines;

a first encryption key associated with at least one ballot question of the plurality of ballot questions, wherein the first encryption key comprises one-half of an asymmetric key pair associated with a first tabulation machine of the plurality of tabulation machines;

a second encryption key associated with at least one different ballot question of the plurality of ballot questions, wherein the second encryption key comprises one-half of an asymmetric key pair associated with a second tabulation machine of the plurality of tabulation machines;

an identity of a first datastore for storing at least a first portion of votes cast in association with the plurality of ballot questions; and an identity of a second datastore for storing at least a second portion of the votes cast in association with the plurality of ballot questions;

in the voting machine, presenting the ballot in a user interface of a voting machine and receiving votes cast in association with the plurality of ballot questions through the user interface;

in the voting machine, encrypting a first portion of the votes cast in association with the at least one ballot question with the first encryption key to generate a first set of encrypted votes, wherein the first encryption key is associated with a first decryption key stored on the first tabulation machine of the plurality of tabulation machines;

in the voting machine, encrypting a second portion of the votes cast in association with the at least one different ballot question with the second encryption key to generate a second set of encrypted votes, wherein the second encryption key is associated with a second decryption key stored on the second tabulation machine of the plurality of tabulation machines;

in the voting machine, sending the first portion of the votes cast in association with the plurality of the ballot questions to the first datastore, wherein the first portion of the votes cast in association with the plurality of the ballot questions comprises at least a portion of the first set of encrypted votes and second portion of the second set of encrypted votes; and in the voting machine, sending the second portion of the votes cast in association with the plurality of the ballot questions to the second datastore, wherein the second portion of the votes cast in association with the plurality of the ballot questions comprises at least a portion of the second set of encrypted votes and second portion of the first set of encrypted votes;

wherein the first tabulation machine retrieves, for tabulation, the portion of the first set of encrypted votes from the first datastore and the second portion of the first set of encrypted votes from the second datastore; and wherein the second tabulation machine retrieves, for tabulation, the portion of the second set of encrypted votes from the second datastore and the second portion of the second set of encrypted votes from the first datastore.

14. The method of claim 13 wherein the first encryption key is a public key of the asymmetric key pair associated with the first tabulation machine and the first decryption key is a private key of the asymmetric key pair associated with the first tabulation machine.

15. The method of claim 13 wherein:

the device identifier unique to the voting machine is a media access control address; and the session configuration service retrieves the session information in an encrypted state using the device identifier unique to the voting machine.

16. The method of claim 13 wherein the first portion of the votes cast in association with the plurality of the ballot questions to the first datastore comprises at least one of the votes encrypted with the first encryption key.

17. The method of claim 13 further comprising decrypting the first portion of the votes using the first decryption key stored on the first tabulation machine.

* * * * *